United States Patent [19]

Imaizumi

[11] Patent Number: 5,557,464
[45] Date of Patent: Sep. 17, 1996

[54] WIDE-FIELD EYEPIECE LENS SYSTEM

[75] Inventor: Masaki Imaizumi, Hachioji, Japan

[73] Assignee: Olympus Optical Co., Ltd., Tokyo, Japan

[21] Appl. No.: 505,396

[22] Filed: Jul. 21, 1995

[30] Foreign Application Priority Data

Jul. 22, 1994 [JP] Japan .................................. 6-191289

[51] Int. Cl.⁶ .................................................. G02B 25/00
[52] U.S. Cl. ......................................... 359/646; 359/643
[58] Field of Search .................................. 359/643, 646, 359/644, 645

[56] References Cited

U.S. PATENT DOCUMENTS

| | | | |
|---|---|---|---|
| 1,478,704 | 12/1923 | Erfle | 359/645 |
| 3,352,620 | 11/1967 | Scidmore et al. | 359/644 |
| 3,384,434 | 5/1968 | Scidmore et al. | 359/644 |
| 4,286,844 | 9/1981 | Nagler | 359/644 |
| 4,525,035 | 6/1985 | Nagler | 359/644 |
| 4,720,183 | 1/1988 | Dilworth | 359/643 |

FOREIGN PATENT DOCUMENTS

| | | |
|---|---|---|
| 56-75615 | 6/1981 | Japan ..................................... 359/645 |
| 56-85723 | 7/1981 | Japan . |
| 6109983 | 4/1994 | Japan . |

Primary Examiner—Georgia Y. Epps
Assistant Examiner—Evelyn A. Lester
Attorney, Agent, or Firm—Cushman, Darby & Cushman

[57] ABSTRACT

A wide field eyepiece lens system composed, in order from a side of an objective lens system, of a first lens unit which is composed of a plurality of lens elements and has a diverging function, and a second lens unit which is composed of a plurality of lens elements and has a converging function. The eyepiece lens system has an apparent field angle of 75° to 80°, an eye relief of 0.95 f or longer and aberrations favorably corrected over an entire range of a visual field thereof including marginal portions, and is configured so as to satisfy the following conditions (1) and (2):

$$-8.0 < f_1/f < -4.8 \qquad (1)$$

$$1.8 < D/f < 2.6 \qquad (2) +EA$$

4 Claims, 5 Drawing Sheets

WIDE-FIELD EYEPIECE LENS SYSTEM

BACKGROUND OF THE INVENTION

1. Field of the Invention

The present invention relates to an eyepiece lens system which has a long eye relief and a wide visual field, and is to be used in telescopes, binocular telescopes and so on.

2. Description of the Prior Art

An eyepiece lens system disclosed by U.S. Pat. No. 1,478,704 is known as a conventional example of eyepiece lens systems which have apparent visual fields on the order of 70°. Further, an eyepiece lens system disclosed by Japanese Patent Kokai Publication No. Hei 6-109,983 is known as another conventional example of eyepiece lens systems which have apparent visual fields on the order of 72° and eye relieves on the order of 1.3 f (f represents a focal length of an eyepiece lens system as a whole). Furthermore, an eyepiece lens system disclosed by Japanese Patent Kokai Publication No. Sho 56-85,723 is known as still another conventional example of eyepiece lens systems which has apparent visual fields exceeding 80°.

The conventional examples mentioned above have defects which are to be described consecutively below:

The conventional example proposed by the U.S. Pat. No. 1,478,704 has a simple composition which comprises a small number of lens elements, but a short eye relief of 0.6 f to 0.68 f, whereby the eyepiece lens system will inevitably has a long focal length when it is configured so as to have a long eye relief. In addition, this eyepiece lens system has an apparent visual field which is as narrow as 70°.

Further, the eyepiece lens system disclosed by Japanese Patent Kokai Publication No. Hei 6-109,983 has an eye relief of 1.27 f to 1.30 f and is sufficiently compact. However, this eyepiece lens system has an apparent visual field of 72° which is rather narrow or not so much larger than those of general wide-field binocular telescopes (having field angles of 65° and larger).

Furthermore, the conventional example proposed by Japanese Patent Kokai Publication No. Sho 56-85,723 produces aberrations within a pupil thereof and allows a visual field thereof to be eclipsed.

SUMMARY OF THE INVENTION

A primary object of the present invention is to provide an eyepiece lens system having an apparent field angle of 75° to 80° which is sufficiently wide as compared with those of binocular telescopes, a sufficient eye relief having a value of 0.95 f or longer, a pupil within which aberrations are scarcely produced and a visual field within which aberrations are corrected even on a marginal portion thereof.

The wide-field eyepiece lens system according to the present invention is composed, in order from an object side of the lens system, of a first lens unit which consists of, a plurality of lens elements and has a diverging function, and a second lens unit which consists of a plurality of lens elements and has a converging function; and configured so as to satisfy the following conditions (1) and (2):

$$-8.0 < f_1/f < -4.8 \quad (1)$$

$$1.8 < D/f < 2.6 \quad (2)$$

wherein the reference symbol f represents a focal length of the eyepiece lens system as a whole, the reference symbol $f_1$ designates a focal length of the first lens unit, and the reference symbol D denotes a distance reserved between the first lens unit and the second lens unit.

In the eyepiece lens system according to the present invention, the first lens unit is configured so as to have the diverging function for reducing a Patzval's sum which governs curvature of an image surface. Further, the first lens unit which has the diverging function serves for directing marginal rays farther from an optical axis (a springing-up function) so that the rays are incident high on the second lens unit having the converging function. Accordingly, rays emerging from the second lens unit are kept high, thereby making it possible to obtain an eyepiece lens system which has a wide visual field and a long eye relief.

The second lens unit has the converging function, or serves for directing the rays which have been spring up by the first lens unit to an eye point while preventing these rays from producing aberrations.

The object of the present invention is attainable by configuring the first lens unit and the second lens unit so as to satisfy the conditions (1) and (2) mentioned above.

The condition (1) defines the diverging function of the first lens unit. If the upper limit of −8.0 of the condition (1) is exceeded, the first lens unit will have a weak diverging power or a low function to spring up the marginal rays, thereby making it impossible to obtain a sufficient eye relief. If the upper limit of −4.8 of the condition (1) is exceeded, in contrast, the first lens unit will have a strong springing-up power and the marginal rays will be incident on the second lens unit at large angles, whereby allowing to obtain a long eye relief, but making it impossible to correct aberrations produced by the second lens unit, in particular curvature of an image surface which is aggravated at an intermediate image height.

The condition (2) defines a distance to be reserved between the first lens unit and the second lens unit. If this distance is shorter than the lower limit of 1.8 of the condition (2), the marginal rays will be incident low on the second lens unit, thereby making it impossible to obtain a sufficient eye relief. When an attempt is made to enhance these rays on the second lens unit by shortening the focal length of the first lens unit, the marginal rays will be incident on the second lens unit at large angles and it will be impossible to correct the curvature of the image surface which is aggravated at the intermediate image height in particular. If the upper limit of 2.6 of the condition (2) is exceeded, in contrast, the distance between the first lens unit and the second lens unit will be long enough to obtain the required eye relief, but the eyepiece lens system will have a large total length contrary to the object of the present invention. When the eyepiece lens system according to the present invention is to be used in a binocular telescope which comprises a prism or other means for inverting an image in particular, an eyepiece lens system having such a large total length will constitute a cause for enlarging the binocular telescope as a whole.

By selecting compositions which are to be described below for the first lens unit and the second lens unit, it is possible to configure the eyepiece lens system according to the present invention so as to have favorable optical performance.

The first lens unit is composed of a cemented lens component which consists of a positive lens element and a negative lens element. The second lens unit is composed of a cemented lens component which consists of a negative lens element and a positive lens element, a positive lens component, and a cemented lens component which consists of a positive lens element and a negative lens element.

The first lens unit has the function to spring up the marginal rays as described above. An amount of lateral chromatic aberration to be produced is remarkably reduced by composing the first lens unit of a positive lens element and a negative lens element as described above.

The second lens unit has the function to direct the marginal rays, which have been sprung up by the first lens unit, to the eye point while preventing the rays from producing aberrations. When the cemented lens component which consists of the negative lens element and the positive lens element is disposed on the side of the objective lens system in the second lens unit, the positive lens element functions to slightly return the marginal rays which have been further sprung up by the negative lens element after they were sprung up by the first lens unit. Further, a cemented surface disposed in the cemented lens component, in particular, produces aberrations of high orders thereby reducing aberrations such as the curvature of the image surface which is remarkable at marginal portions.

The positive lens component which is disposed in the second lens unit has a function to abruptly deflect the sprung up marginal rays to the eye point. Further, the cemented lens component which is disposed on the side of the observer's eyes, and composed of the positive lens element and the negative lens element, further deflects the marginal rays which have been directed to the eye point by the positive lens component so as to have an apparent field angle of 75° to 80°. Furthermore, the cemented lens component which is disposed on the side of the observer's eyes has a composition symmetrical with that of the cemented lens component which is disposed on the side of the objective lens system or is composed, in order from the side of the objective lens system, of the positive lens element and the negative lens element so as to cancel aberrations produced by the negative lens element and the positive lens element of the cemented lens component which is disposed on the side of the objective lens system.

Moreover, it is desirable to configure the eyepiece lens system according to the present invention so as to satisfy the following conditions (3), (4), (5) and (6):

$$n_{2p} > 1.58 \quad (3)$$

$$|\upsilon_{1-1} - \upsilon_{1-2}| > 35 \quad (4)$$

$$0.07 < |n_{2-11} - n_{2-12}| < 0.25 \quad (5)$$

$$0.07 < |n_{2-31} - n_{2-32}| < 0.25 \quad (6)$$

wherein the reference symbol $n_{2p}$ represents a refractive index of the positive lens component disposed in the second lens unit, the reference symbols $n_{2-11}$ and $n_{2-12}$ designate refractive indices of the negative lens element and the positive lens element respectively used in the cemented lens component disposed on the side of the objective lens system in the second lens unit, the reference symbols $n_{2-31}$ and $n_{2-32}$ denote refractive indices of the positive lens element and the negative lens element respectively used in the cemented lens component disposed on the side of the observer's eves in the second lens unit, and the reference symbols $\upsilon_{1-1}$ and $\upsilon_{1-2}$ represent Abbe's numbers of the positive lens element and the negative lens element respectively used in the first lens unit.

The condition (3) defines a refractive index of the positive lens component which is disposed between the cemented lens components in the second lens unit. This lens component has the function to abruptly deflect the marginal rays toward the optical axis so that they are directed to the eye point. If the lower limit of 1.58 of the condition (3) is exceeded, the positive lens component must have high curvature for directing the marginal rays to he eye point, thereby bringing about undesirable results such as insufficient marginal thickness of the lens component, spherical aberration produced within a pupil, eclipse of a visual field and/or aggravation of spherical aberration. Further, a Petzval's sum will be enlarged, thereby aggravating curvature of an image surface on marginal portions of the visual field.

For correcting spherical aberration and distortion to be produced within the pupil, it is effective to use an aspherical surface on the positive lens component.

The condition (4) is required for configuring the first lens unit so as to be achromatic. If the lower limit of 35 of the condition (4) is exceeded, lateral chromatic aberration will be too remarkable for correction by the second lens unit. In particular, a variation (curvature) of lateral chromatic aberration will be largely dependent on image heights.

The conditions (5) and (6) define differences in refractive indices between the lens elements used in the cemented lens components disposed in the second lens unit. Speaking more concretely, the condition (5) defines a difference in refractive indices between the lens elements used in-the cemented lens component disposed on the side of the objective lens system in the second lens unit, whereas the condition (6) defines a difference in refractive indices between the lens elements used in the cemented lens component disposed on the side of the observer's eyes in the second lens unit.

If the lower limit of the condition (5) or (6) is exceeded, a cemented surface disposed in the cemented lens component will have a weak refractive power, thereby remarkably deforming a meridional image surface which is corrected by a difference between refractive indices before and after the cemented surface. If the upper limit of the condition (5) or (6) is exceeded, in contrast, the positive lens element used in the cemented lens component has too low a refractive index, thereby enlarging a Petzval's sum of the eyepiece lens system and remarkably curving the image surface at marginal portions of the visual field.

DETAILED DESCRIPTION OF THE PREFERRED EMBODIMENTS

Figure 1:
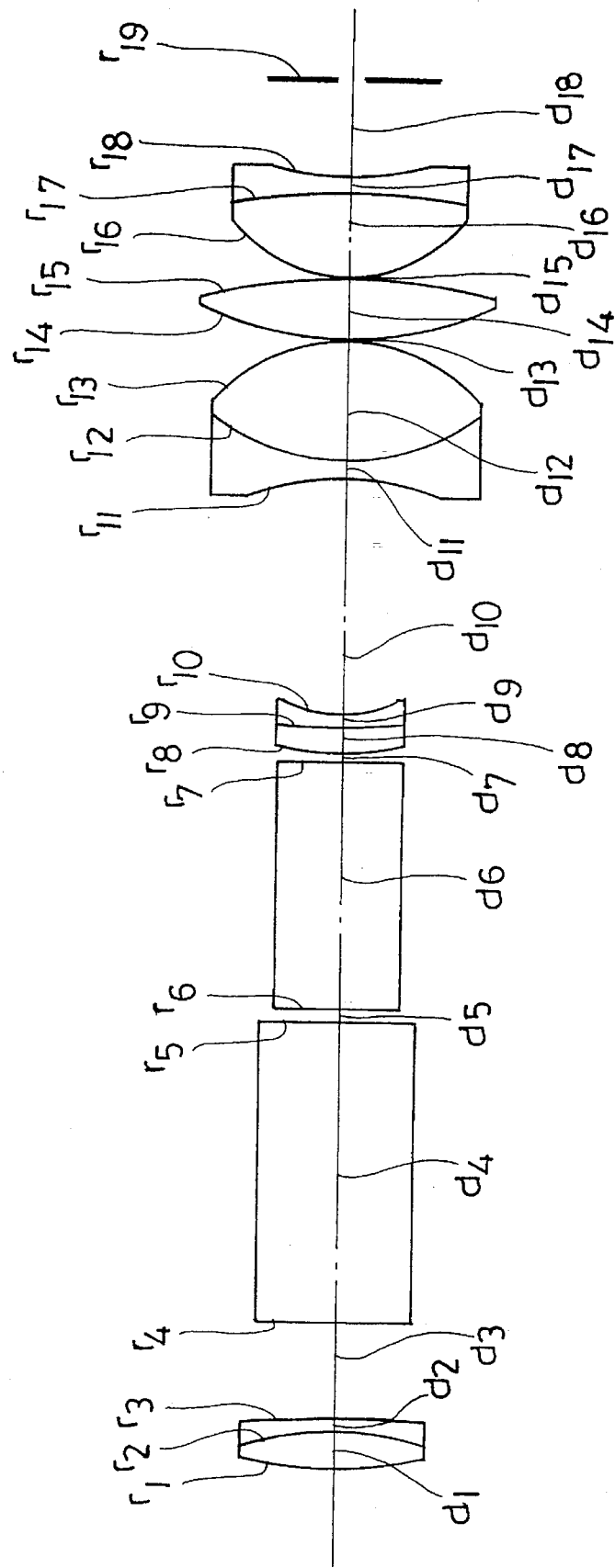
FIG. 1 through FIG. 5 show sectional views illustrating compositions of a first embodiment through a fifth embodiment of the eyepiece lens system according to the present invention.

Now, the eyepiece lens system according to the present invention will be described more detailedly below with reference to the preferred embodiments thereof illustrated in the accompanying drawings and given in the form of the numerical data which is listed below:

Embodiment 1

$\beta = 7.0$, $2\omega = 80°$, $L = 11.0(0.97f)$, $f = 11.371$
$f_1 = -84.034$, $f_1/f = -7.39$, $D = 27.25$, $D/f = 2.40$ $r_1 = 46.229$
$\quad d_1 = 4.2 \quad n_1 = 1.51633 \quad \nu_1 = 64.15$
$r_2 = -33.692$
$\quad d_2 = 1.5 \quad n_2 = 1.62004 \quad \nu_2 = 36.25$
$r_3 = -135.478$ -continued

Embodiment 1

| | | | |
|---|---|---|---|
| $r_4 = \infty$ | $d_3 = 10.7337$ | | |
| | $d_4 = 34$ | $n_3 = 1.56883$ | $v_3 = 56.34$ |
| $r_5 = \infty$ | $d_5 = 1.5$ | | |
| $r_6 = \infty$ | | | |
| | $d_6 = 28$ | $n_4 = 1.56883$ | $v_4 = 56.34$ |
| $r_7 = \infty$ | $d_7 = 1.0$ | | |
| $r_8 = 30.587$ | | | |
| | $d_8 = 2.9$ | $n_5 = 1.80518$ | $v_5 = 25.43$ |
| $r_9 = 84.9748$ | $d_9 = 1.5$ | $n_6 = 1.51633$ | $v_6 = 64.15$ |
| $r_{10} = 13.8041$ | | | |
| | $d_{10} = 27.25$ | | |
| $r_{11} = -28.0105$ | $d_{11} = 2.0$ | $n_7 = 1.76182$ | $v_7 = 26.52$ |
| $r_{12} = 26.0562$ | | | |
| | $d_{12} = 13.5$ | $n_8 = 1.60311$ | $v_8 = 60.68$ |
| $r_{13} = -20.0185$ | $d_{13} = 0.3$ | | |
| $r_{14} = 41.2073$ | | | |
| | $d_{14} = 6.6$ | $n_9 = 1.7725$ | $v_9 = 49.6$ |
| $r_{15} = -69.3813$ | $d_{15} = 0.3$ | | |
| $r_{16} = 16.2697$ | | | |
| | $d_{16} = 9.4$ | $n_{10} = 1.60311$ | $v_{10} = 60.68$ |
| $r_{17} = -87.5767$ | $d_{17} = 1.84$ | $n_{11} = 1.76182$ | $v_{11} = 26.52$ |
| $r_{18} = 30.867$ | | | |

$n_{2p} = 1.7725$, $|v_{1-1} - v_{1-1'}| = 38.7$
$|n_{2-11} - n_{2-12}| = 0.15871$, $|n_{2-31} - n_{2-32}| = 0.15871$

Embodiment 2

$\beta = 7.0$, $2\omega = 80°$, $L = 11.0(0.97f)$, $f = 11.377$
$f_1 = -66.466$, $f_1/f = -5.84$, $D = 23.7$, $D/f = 2.08$

| | | | |
|---|---|---|---|
| $r_1 = 46.229$ | | | |
| | $d_1 = 4.2$ | $n_1 = 1.51633$ | $v_1 = 64.15$ |
| $r_2 = -33.692$ | $d_2 = 1.5$ | $n_2 = 1.62004$ | $v_2 = 36.25$ |
| $r_3 = -135.478$ | | | |
| | $d_3 = 14.24$ | | |
| $r_4 = \infty$ | $d_4 = 34$ | $n_3 = 1.56883$ | $v_3 = 56.34$ |
| $r_5 = \infty$ | | | |
| | $d_5 = 1.5$ | | |
| $r_6 = \infty$ | $d_6 = 28$ | $n_4 = 1.56883$ | $v_4 = 56.34$ |
| $r_7 = \infty$ | | | |
| | $d_7 = 1.0$ | | |
| $r_8 = 30.5187$ | $d_8 = 2.9$ | $n_5 = 1.80518$ | $v_5 = 25.43$ |
| $r_9 = 105.7834$ | | | |
| | $d_9 = 1.5$ | $n_6 = 1.51633$ | $v_6 = 64.15$ |
| $r_{10} = 12.4262$ | $d_{10} = 23.7$ | | |
| $r_{11} = -37.6462$ | | | |
| | $d_{11} = 2.0$ | $n_7 = 1.76182$ | $v_7 = 26.52$ |
| $r_{12} = 26.4772$ | $d_{12} = 13.5$ | $n_8 = 1.60311$ | $v_8 = 60.68$ |
| $r_{13} = -18.7398$ | | | |
| | $d_{13} = 0.3$ | | |
| $r_{14} = 47.6794$ | $d_{14} = 6.3$ | $n_9 = 1.69680$ | $v_9 = 55.53$ |
| $r_{15} = -91.0670$ | | | |
| | $d_{15} = 0.3$ | | |
| $r_{16} = 15.3289$ | $d_{16} = 9.4$ | $n_{10} = 1.60311$ | $v_{10} = 60.68$ |
| $r_{17} = -295.2200$ | | | |
| | $d_{17} = 1.80$ | $n_{11} = 1.76182$ | $v_{11} = 26.52$ |
| $r_{18} = 32.4987$ | | | |

$n_{2p} = 1.6968$, $|v_{1-1} - v_{1-2}| = 38.7$
$|n_{2-11} - n_{2-12}| = 0.15871$, $|n_{2-31} - n_{2-32}| = 0.15871$

Embodiment 3

$\beta = 7.0$, $2\omega = 75°$, $L = 11.0(0.97f)$, $f = 11.380$
$f_1 = -61.427$, $f_1/f = -5.40$, $D = 22.42$, $D/f = 1.97$

| | | | |
|---|---|---|---|
| $r_1 = 46.229$ | | | |
| | $d_1 = 4.2$ | $n_1 = 1.51633$ | $v_1 = 64.15$ |
| $r_2 = -33.692$ | $d_2 = 1.5$ | $n_2 = 1.62004$ | $v_2 = 36.25$ |
| $r_3 = -135.478$ | | | |
| | $d_3 = 15.52$ | | |
| $r_4 = \infty$ | $d_4 = 34$ | $n_3 = 1.56883$ | $v_3 = 56.34$ |
| $r_5 = \infty$ | | | |
| | $d_5 = 1.5$ | | |
| $r_6 = \infty$ | $d_6 = 28$ | $n_4 = 1.56883$ | $v_4 = 56.34$ |
| $r_7 = \infty$ | | | |
| | $d_7 = 1.0$ | | |
| $r_8 = 30.8417$ | $d_8 = 2.9$ | $n_5 = 1.80518$ | $v_5 = 25.43$ |
| $r_9 = 73.4239$ | | | |
| | $d_9 = 1.5$ | $n_6 = 1.51633$ | $v_6 = 64.15$ |
| $r_{10} = 12.5142$ | $d_{10} = 22.42$ | | |
| $r_{11} = -43.8831$ | | | |
| | $d_{11} = 2.0$ | $n_7 = 1.76182$ | $v_7 = 26.52$ |
| $r_{12} = 22.4941$ | $d_{12} = 13.5$ | $n_8 = 1.60311$ | $v_8 = 60.68$ |
| $r_{13} = -17.6110$ | | | |
| | $d_{13} = 0.3$ | | |
| $r_{14} = 50.0921$ | $d_{14} = 6.0$ | $n_9 = 1.62041$ | $v_9 = 60.27$ |
| $r_{15} = -103.1101$ | | | |
| | $d_{15} = 0.3$ | | |
| $r_{16} = 14.8691$ | $d_{16} = 9.4$ | $n_{10} = 1.60311$ | $v_{10} = 60.68$ |
| $r_{17} = -319.7722$ | | | |
| | $d_{17} = 1.80$ | $n_{11} = 1.76182$ | $v_{11} = 26.52$ |
| $r_{18} = 32.7586$ | | | |

$n_{2p} = 1.62041$, $|v_{1-1} - v_{1-2}| = 38.7$
$|n_{2-11} - n_{2-12}| = 0.15871$, $|n_{2-31} - n_{2-32}| = 0.15871$

Embodiment 4

$\beta = 7.0$, $2\omega = 80°$, $L = 11.0(0.97f)$, $f = 11.372$
$f_1 = -80.450$, $f_1/f = -7.07$, $D = 26.24$, $D/f = 2.31$

| | | | |
|---|---|---|---|
| $r_1 = 46.229$ | | | |
| | $d_1 = 4.2$ | $n_1 = 1.51633$ | $v_1 = 64.15$ |
| $r_2 = -33.692$ | $d_2 = 1.5$ | $n_2 = 1.62004$ | $v_2 = 36.25$ |
| $r_3 = -135.478$ | | | |
| | $d_3 = 10.3621$ | | |
| $r_4 = \infty$ | $d_4 = 34$ | $n_3 = 1.56883$ | $v_3 = 56.34$ |
| $r_5 = \infty$ | | | |
| | $d_5 = 1.5$ | | |
| $r_6 = \infty$ | $d_6 = 28$ | $n_4 = 1.56883$ | $v_4 = 56.34$ |
| $r_7 = \infty$ | | | |
| | $d_7 = 1.0$ | | |
| $r_8 = 31.2274$ | $d_8 = 3.8$ | $n_5 = 1.78472$ | $v_5 = 25.68$ |
| $r_9 = 99.9764$ | | | |
| | $d_9 = 1.5$ | $n_6 = 1.51633$ | $v_6 = 64.15$ |
| $r_{10} = 13.6262$ | $d_{10} = 26.24$ | | |
| $r_{11} = -34.5576$ | | | |
| | $d_{11} = 2.0$ | $n_7 = 1.80518$ | $v_7 = 25.43$ |
| $r_{12} = 30.2380$ | $d_{12} = 13.0$ | $n_8 = 1.58913$ | $v_8 = 61.18$ |
| $r_{13} = -19.2241$ | | | |
| | $d_{13} = 0.3$ | | |
| $r_{14} = 42.7299$ | $d_{14} = 5.7$ | $n_9 = 1.77250$ | $v_9 = 49.60$ |
| $r_{15} = -88.3034$ | | | |
| | $d_{15} = 0.3$ | | |

-continued

Embodiment 4

$r_{16} = 16.7008$ $r_{17} = -67.4773$ $r_{18} = 59.1871$

| | | | |
|---|---|---|---|
| $d_{16} = 9.6$ | $n_{10} = 1.58913$ | $v_{10} = 61.18$ |
| $d_{17} = 1.90$ | $n_{11} = 1.80518$ | $v_{11} = 25.43$ |

$n_{2p} = 1.77250$, $|v_{1-1} - v_{1-2}| = 38.5$
$|n_{2-11} - n_{2-12}| = 0.21605$, $|n_{2-31} - n_{2-32}| = 0.21605$

Embodiment 5

$\beta = 7.0$, $2\omega = 80°$, $L = 11.0(0.97f)$, $f = 11.372$
$f_1 = -80.213$, $f_1/f = -7.05$, $D = 26.31$, $D/f = 2.31$

| | | | |
|---|---|---|---|
| $r_1 = 46.229$ | | | |
| | $d_1 = 4.2$ | $n_1 = 1.51633$ | $v_1 = 64.15$ |
| $r_2 = -33.692$ | | | |
| | $d_2 = 1.5$ | $n_2 = 1.62004$ | $v_2 = 36.25$ |
| $r_3 = -135.478$ | | | |
| | $d_3 = 10.3$ | | |
| $r_4 = \infty$ | | | |
| | $d_4 = 34$ | $n_3 = 1.56883$ | $v_3 = 56.34$ |
| $r_5 = \infty$ | | | |
| | $d_5 = 1.5$ | | |
| $r_6 = \infty$ | | | |
| | $d_6 = 28$ | $n_4 = 1.56883$ | $v_4 = 56.34$ |
| $r_7 = \infty$ | | | |
| | $d_7 = 1.0$ | | |
| $r_8 = 28.3503$ | | | |
| | $d_8 = 3.8$ | $n_5 = 1.78472$ | $v_5 = 25.68$ |
| $r_9 = 54.1429$ | | | |
| | $d_9 = 1.5$ | $n_6 = 1.51633$ | $v_6 = 64.15$ |
| $r_{10} = 13.3633$ | | | |
| | $d_{10} = 26.31$ | | |
| $r_{11} = -26.3226$ | | | |
| | $d_{11} = 2.0$ | $n_7 = 1.80518$ | $v_7 = 25.43$ |
| $r_{12} = 24.6101$ | | | |
| | $d_{12} = 14.0$ | $n_8 = 1.69680$ | $v_8 = 55.53$ |
| $r_{13} = -21.5812$ | | | |
| | $d_{13} = 0.3$ | | |
| $r_{14} = 39.8383$ | | | |
| | $d_{14} = 6.7$ | $n_9 = 1.77250$ | $v_9 = 49.60$ |
| $r_{15} = -77.3351$ | | | |
| | $d_{15} = 0.3$ | | |
| $r_{16} = 16.1449$ | | | |
| | $d_{16} = 9.2$ | $n_{10} = 1.58913$ | $v_{10} = 61.18$ |
| $r_{17} = -99.9408$ | | | |
| | $d_{17} = 1.89$ | $n_{11} = 1.80518$ | $v_{11} = 25.43$ |
| $r_{18} = 34.2909$ | | | |

$n_{2p} = 1.77250$, $|v_{1-1} - v_{1-2}| = 38.5$
$|n_{2-11} - n_{2-12}| = 0.10838$, $|n_{2-31} - n_{2-32}| = 0.21605$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's number of the respective lens elements. In the numerical data listed above, the reference symbol $\beta$ represents a magnification, the reference symbol $2\omega$ designates an apparent visual field, the reference symbol L denotes a distance as measured to an eye point, the reference symbols f represents a focal length of an eyepiece lens system as a whole, the reference symbol $f_1$ designates a focal length of a first lens unit, and the reference symbol D denotes a distance between the first lens unit and a second lens unit.

Figure 2:
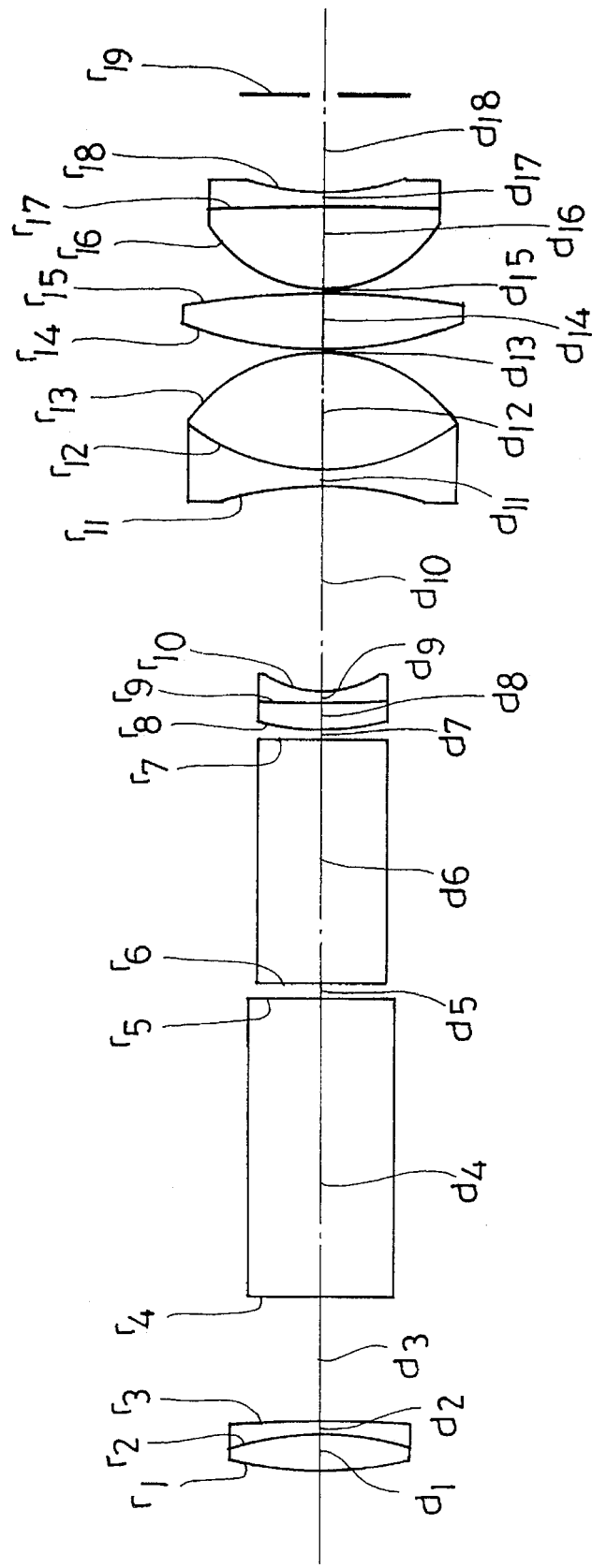
Figure 3:
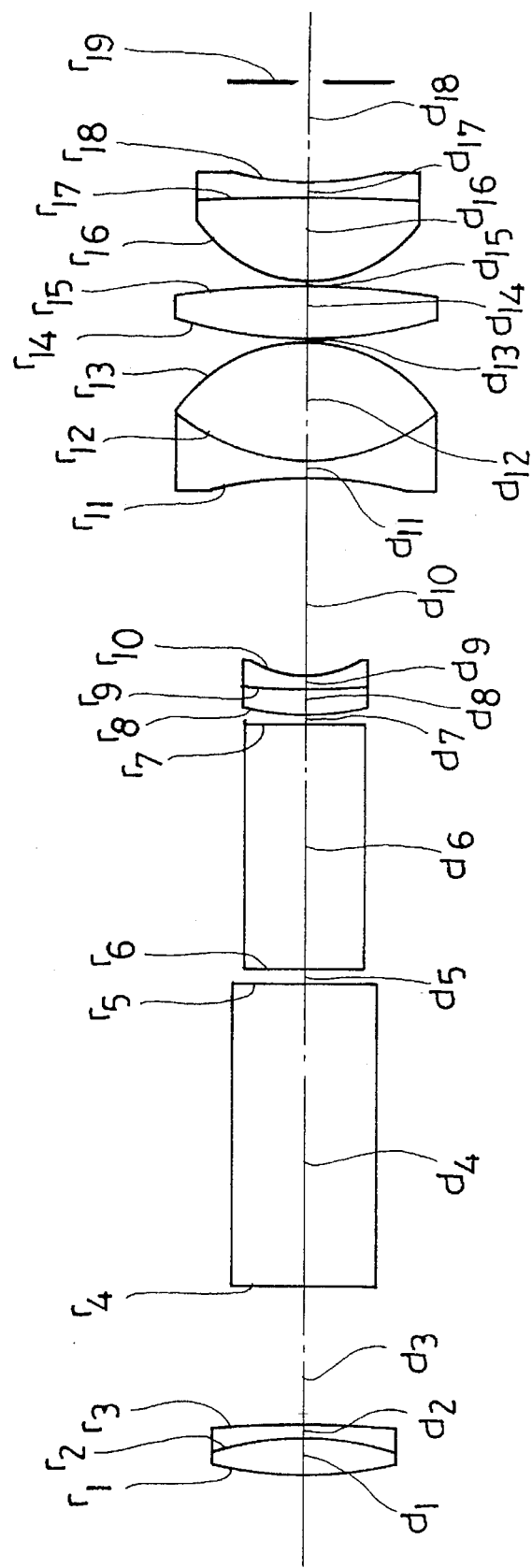
Figure 4:
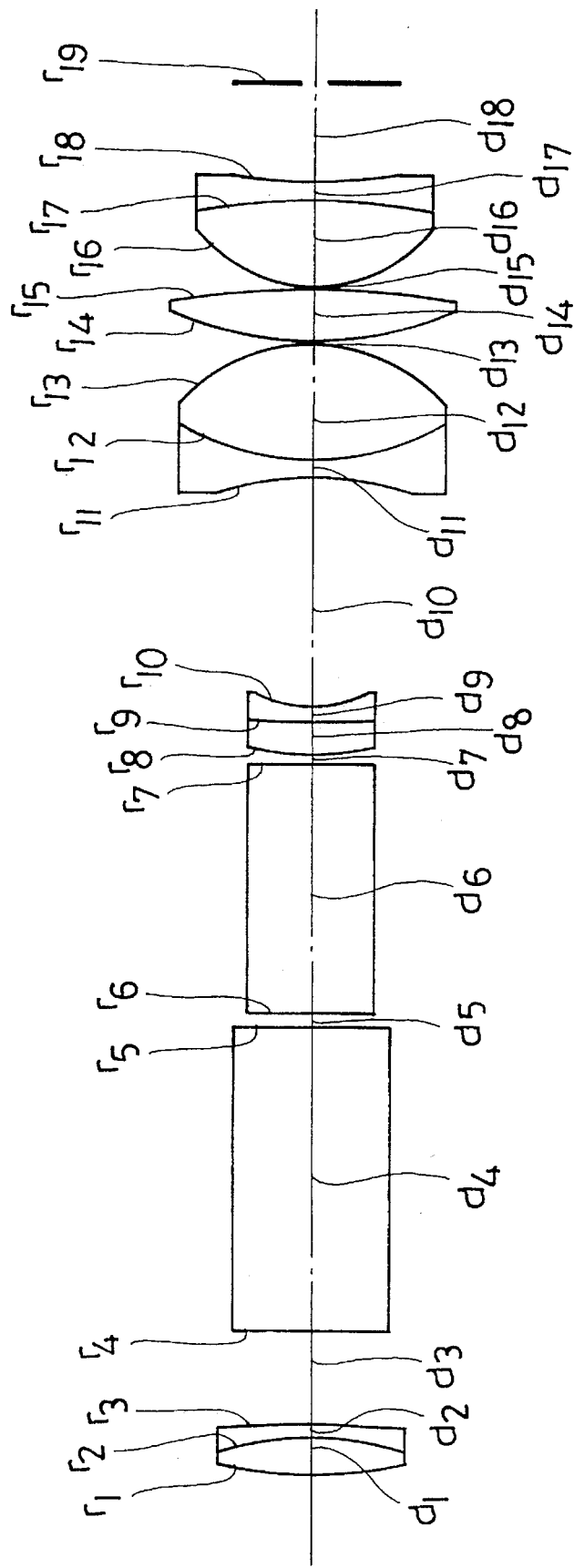
Figure 5:
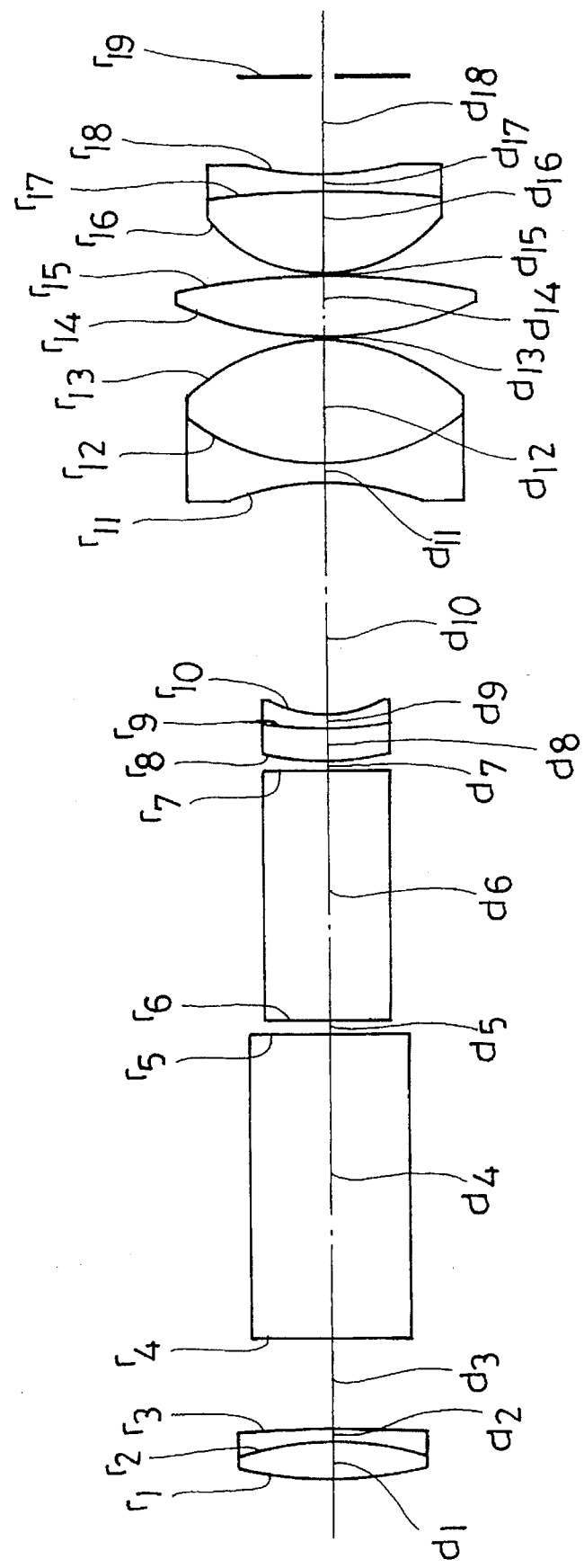

The first through fifth embodiments have compositions illustrated in FIG. 1 through FIG. 5 respectively, wherein the reference symbols $r_1$ through $r_3$ represent an objective lens system, the reference symbols $r_4$ through $r_7$ designate an image inverting prism optical system, and the reference symbols $r_8$ through $r_{18}$ correspond to the eyepiece lens system according to the present invention. In FIG. 1 through FIG. 5, the reference symbol $r_{19}$ represents an eye point and the reference symbol $d_{18}$ designates a distance (L) as measured to an eye point.

Each of the eyepiece lens systems preferred as the embodiments of the present invention consists of: a first lens unit which is composed of a cemented lens component consisting of a positive lens element and a negative lens element; and a second lens unit which is composed of a cemented lens component which consists of a biconcave lens element and a biconvex lens element, and is disposed on the side of the objective lens system, a biconvex lens component, and a cemented lens component which consists of a biconvex lens element and a biconcave lens element, and is disposed on the side of the observer's eyes.

As is understood from the foregoing description, the eyepiece lens system according to the present invention has an apparent field angle of 75° to 80° which is sufficiently large as compared with those of binocular telescopes (having field angles of 65° and larger), an eye relief of 0.95 f and a compact size; nevertheless scarcely allows aberrations to be produced within a pupil thereof and makes a visual field almost completely free from aberrations such as curvature of an image surface and, distortion and lateral chromatic aberration over an entire range of a visual field thereof including marginal portions thereof.

I claim:

1. A wide-field eyepiece lens system comprising, in order from an object side of the lens system, of a first lens unit which is composed of a plurality of lens elements and has a diverging function, and a second lens unit which is composed of a plurality of lens elements and has a converging function, wherein said eyepiece lens system is configured so as to satisfy the following conditions (1) and (2):

$$-8.0 < f_1/f < -4.8 \tag{1}$$

$$1.8 < D/f < 2.6 \tag{2}$$

wherein the reference symbol f represents a focal length of said eyepiece lens system as whole, the reference symbol $f_1$ designates a focal length of said first lens unit, and the reference symbol D denotes a distance between said first lens unit and said second lens unit.

2. A wide-field eyepiece lens system comprising, in order from an object side of the lens system, first lens unit which is composed of a plurality of lens element and has a diverging function, and a second lens unit which is composed of a plurality of lens elements and has a converging function, wherein said first lens unit is composed of a cemented lens component consisting of a positive lens element and a negative lens element, and wherein said second lens unit is composed of a cemented lens component consisting of a negative lens element and a positive lens element, a positive lens Component, and a cemented lens component consisting of a positive lens element and a negative lens element.

3. A wide-field eyepiece lens system according to claim 2 satisfying the following conditions (3) through (6):

$$n_{2p} > 1.58 \tag{3}$$

$$|v_{1-1} - v_{1-2}| > 35 \tag{4}$$

$$0.07 < |n_{2-11} - n_{2-12}| < 0.25 \tag{5}$$

$$0.07 < |n_{2-31} n_{2-32}| < 0.25 \tag{6}$$

wherein the reference symbol $n_{2p}$ represents a refractive index of the positive lens component disposed in the second lens unit, the reference symbols $n_{2-11}$ and $n_{2-12}$ designate refractive indices of the negative lens element and the positive lens element respectively used in the cemented lens component disposed on the side of the objective lens system in the second lens unit, the reference symbols $n_{2-31}$ and $n_{2-32}$ denote refractive indices of the positive lens element and the negative lens element respectively used in the cemented lens component disposed on the side of the observer's eyes in the second lens unit, and the reference symbols $\upsilon_{1-1}$ and $\upsilon_{1-2}$ represent Abbe's numbers of the positive lens element and the negative lens element respectively used in the first lens unit.

4. A wide-field eyepiece lens system according to claim 1, wherein said first lens unit is composed of a cemented lens component consisting of a positive lens element and a negative lens element, wherein said second lens unit is composed of a cemented lens component consisting of a negative lens element and a positive lens element, a positive lens component, and a cemented lens component consisting of a positive lens element and a negative lens element, and wherein said eyepiece lens system is configured so as to satisfy the following conditions (3) through (6):

$$n_{2p} > 1.58 \qquad (3)$$

$$|\upsilon_{1-1} - \upsilon_{1-2}| > 35 \qquad (4)$$

$$0.07 < |n_{2-11} - n_{2-12}| < 0.25 \qquad (5)$$

$$0.07 < |n_{2-31} - n_{2-32}| < 0.25 \qquad (6)$$

wherein the reference symbol $n_{2p}$ represents a refractive index of the positive lens component disposed in the second lens unit, the reference symbols $n_{2-11}$ and $n_{2-12}$ designates refractive indices of the negative lens element and the positive lens element respectively used in the cemented lens component disposed on the side of the objective lens system in the second lens unit, the reference symbols $n_{2-31}$ and $n_{2-32}$ denote refractive indices of the positive lens element and the negative lens element respectively used in the cemented lens component disposed on the side of the observer's eyes in the second lens unit, and the reference symbols $\upsilon_{1-1}$ and $\upsilon_{1-2}$ represent Abbe's numbers of the positive lens element and the negative lens element respectively used in the first lens unit.

* * * * *